United States Patent
V et al.

(10) Patent No.: US 9,653,891 B2
(45) Date of Patent: May 16, 2017

(54) ELECTRICAL COMPONENT FOR RAIL MOUNTING

(75) Inventors: Thirumurthy V, Bangalore (IN); Suresh Thota, Hyderabad (IN); Kumar Jayanth, Bangalore (IN)

(73) Assignee: TE Connectivity India Private Limited, Bangalore (IN)

( * ) Notice: Subject to any disclaimer, the term of this patent is extended or adjusted under 35 U.S.C. 154(b) by 23 days.

(21) Appl. No.: 14/241,517

(22) PCT Filed: Aug. 17, 2012

(86) PCT No.: PCT/EP2012/066076
§ 371 (c)(1),
(2), (4) Date: Feb. 27, 2014

(87) PCT Pub. No.: WO2013/030012
PCT Pub. Date: Mar. 7, 2013

(65) Prior Publication Data
US 2014/0226287 A1   Aug. 14, 2014

(30) Foreign Application Priority Data
Aug. 30, 2011   (IN) .......................... 2489/DEL/2011

(51) Int. Cl.
*H02B 1/052*   (2006.01)
*H01R 13/00*   (2006.01)

(52) U.S. Cl.
CPC .................................. *H02B 1/052* (2013.01)

(58) Field of Classification Search
CPC .................................. H02B 1/052; H05K 7/12
See application file for complete search history.

(56) References Cited

U.S. PATENT DOCUMENTS

| 4,268,108 A | 5/1981 | Debaigt | |
|---|---|---|---|
| 5,049,094 A * | 9/1991 | Heng | H02B 1/052 |
| | | | 439/716 |
| 5,090,922 A * | 2/1992 | Rymer | H01R 9/2608 |
| | | | 439/716 |
| 5,480,310 A * | 1/1996 | Baum | H01R 9/2691 |
| | | | 439/716 |

(Continued)

FOREIGN PATENT DOCUMENTS

| EP | 0465883 A1 | 1/1992 |
|---|---|---|
| FR | 2113339 A5 | 6/1972 |
| FR | 2113340 A5 | 6/1972 |

(Continued)

OTHER PUBLICATIONS

International Search Report and Written Opinion issued by the European Patent Office, dated Oct. 31, 2012, for related International Application No. PCT/EP2012/066076; 10 pages.

(Continued)

*Primary Examiner* — Xanthia C Cunningham
(74) *Attorney, Agent, or Firm* — Faegre Baker Daniels LLP

(57) ABSTRACT

An electrical component that is adapted for being mounted onto a rail comprises a first outward-facing slot for receiving a first brim of a rail of a first type, a first outward-facing snap-lock for fixating a second brim of a rail of the first type, a first inward-facing slot for receiving a first brim of a rail of a second type and a first inward-facing snap-lock for fixating a second brim of a rail of the second type.

15 Claims, 9 Drawing Sheets

(56) References Cited

U.S. PATENT DOCUMENTS 5,797,756 A * 8/1998 Nad .................... H01R 9/2691
439/716
2002/0037671 A1* 3/2002 Stuckmann ............. H01R 9/26
439/709

FOREIGN PATENT DOCUMENTS

FR          2440631          5/1980
FR          2590438 A1       5/1987

OTHER PUBLICATIONS

International Preliminary Report on Patentability issued by The International Bureau of WIPO, Geneva, Switzerland, dated Mar. 4, 2014, for International Application No. PCT/EP2012/066076; 5 pages.

* cited by examiner

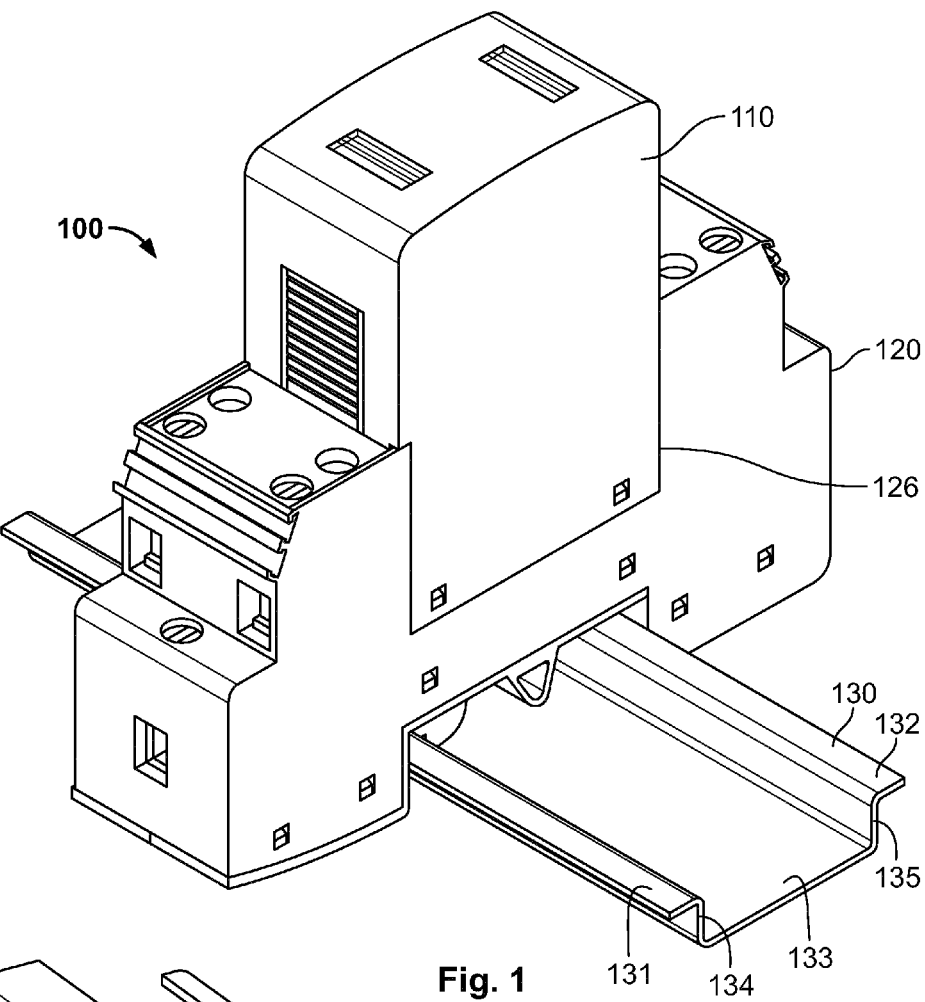
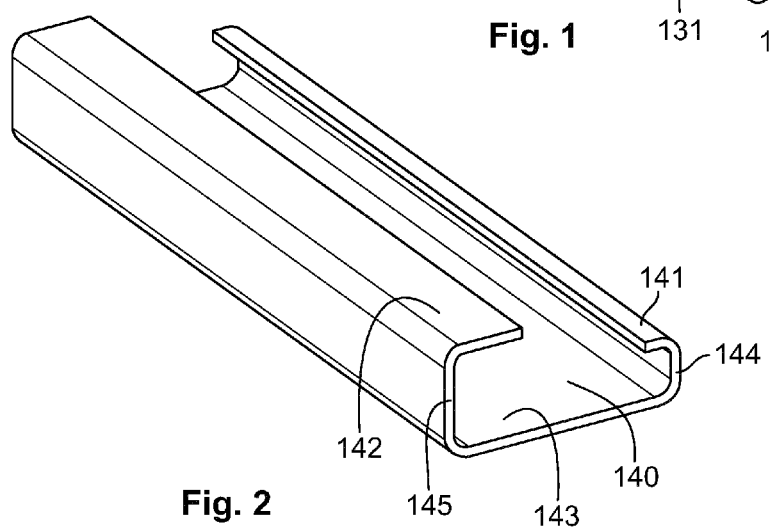
Fig. 1
Fig. 2

ELECTRICAL COMPONENT FOR RAIL MOUNTING

BACKGROUND OF THE DICLOSURE

The present invention relates to an electrical component adapted for being mounted onto a rail according to claim 1 and to a method for mounting an electrical component onto a rail according to claim 14.

It is known in the state of the art to mount electrical components onto rails. To this end, it is known to provide electrical components with means for mounting the electrical components onto rails. These means are conventionally adapted for one specific kind of rails only. It is not possible to mount the same electrical component onto several different types of rails.

A DIN rail is a metal rail of defined dimensions widely used for mounting electrical components inside equipment racks or at other locations. DIN rails are standardized by the Deutsches Institut für Normung, the German national standards organization.

DIN rails are available in several standardized types and sizes. The most popular type is type T that is also referred to as type O or top-hat type and comprises a hat-shaped cross-section. The most popular variant of this type is 35 mm wide. Another wide-spread type is type G that comprises a G-shaped cross-section. G-type DIN rails are usually 32 mm wide.

SUMMARY OF THE DICLOSURE

It is an object of the present invention to provide an electrical component that is adapted for being mounted onto different kinds of rails. This objective is achieved by an electrical component according to claim 1. It is a further object of the present invention to provide a method for mounting an electrical component onto a rail. This objective is achieved by a method according to claim 14. Preferred embodiments are disclosed in the dependent claims.

An electrical component according to the invention is adapted for being mounted onto a rail. The electrical component comprises a first outward-facing slot for receiving a first brim of a rail of a first type, a first outward-facing snap-lock for fixating a second brim of a rail of the first type, a first inward-facing slot for receiving a first brim of a rail of a second type, and a first inward-facing snap-lock for fixating a second brim of a rail of the second type. Advantageously, this electrical component can be mounted onto either a rail of the first type or a rail of the second type without requiring any modifications of the electrical component.

In a preferred embodiment of the electrical component, the first outward-facing snap-lock and the first inward-facing snap-lock comprise an electrically insulating, elastically deformable material, preferably a plastic material. Advantageously, the elastically deformable snap-locks allow for mounting the electrical component onto the rail without using any additional tool.

In a preferred embodiment of the electrical component, the first outward-facing slot and the first inward-facing slot comprise an electrically conductive material, preferably a metal. Advantageously, the outward-facing slot and the inward-facing slot may then also provide a grounding contact for the electrical component for grounding a fault current of the electrical component to the rail.

According to a further development, the electrical component comprises a first grounding edge that is adapted to electrically contact a second brim of a rail of the second type that is fixated by the first inward-facing snap-lock. Advantageously, the grounding edge provides an additional grounding contact for the electrical component for providing a reliable grounding connection with a low electric resistance between the electrical component and a rail of the second type.

According to a further development, the electrical component comprises a grounding lip that is adapted to electrically contact a second brim of a rail of the first type that is fixated by the first outward-facing snap-lock. Advantageously, the grounding lip provides an additional grounding contact for the electrical component for providing a reliable grounding connection with a low electric resistance between the electrical component and a rail of the first type.

In one embodiment, the electrical component comprises an electrically conductive grounding assembly. The grounding assembly comprises the first outward-facing slot and the first inward-facing slot. Advantageously, the grounding assembly provides an electrically conductive connection between the first outward-facing slot and the first inward-facing slot. A further advantage is that the grounding assembly allows for a simple construction of the electrical component that requires only a minimal number of individual parts.

In an especially preferred embodiment, the grounding assembly further comprises the first grounding edge and the grounding lip. Advantageously, the grounding assembly short-cuts all grounding contacts of the electrical component, allowing for a robust and fault-insensitive construction of the electrical component.

In one embodiment, the electrical component comprises a release latch for releasing a second brim of a rail of the second type from the first inward-facing snap-lock. Advantageously, the release latch allows for releasing the electrical component from a rail of the second type without damaging the electrical component.

According to a further development, the electrical component comprises a second outward-facing slot for receiving a first brim of a rail of the first type, a second outward-facing snap-lock for fixating a second brim of a rail of the first type, a second inward-facing slot for receiving a first brim of a rail of the second type, and a second inward-facing snap-lock for fixating a second brim of a rail of the second type. Advantageously, the second outward-facing slot, the second outward-facing snap-lock, the second inward-facing slot and the second inward-facing snap-lock allow for a tight and robust fixation of the electrical component on a rail.

According to one embodiment, the electrical component comprises a receptacle, wherein the receptacle comprises a first recess for receiving a portion of a rail. Advantageously, this allows the electrical component to be mounted onto the rail in a space-saving manner.

In a preferred embodiment of the electrical component, the receptacle comprises a second recess for receiving an electric module. Advantageously, the receptacle of the electrical component may then be equipped with different electric modules adapted for different purposes.

In a preferred embodiment of the electrical component, a rail of the first rail type is a G-type DIN rail, and a rail of the second rail type is a T-type DIN rail. Advantageously, G-type DIN rail and T-type DIN rail are standardized rail type that are widely used for industrial applications.

In a preferred embodiment, the electrical component is adapted for being mounted onto a 35 mm T-type DIN rail and for being mounted onto a 32 mm G-type DIN rail.

Advantageously, 35 mm T-type DIN rails and 32 mm G-type DIN rails are widely used variants of DIN rails.

In one embodiment, the electrical component is a surge-protection device. Advantageously, the electrical component may then serve to protect against electrical surges and spikes in power-distribution panels, process control systems, communications systems, and other industrial systems.

A method for mounting an electrical component onto a rail according to the present invention comprises steps of hinging a first brim of the rail in a first slot of the electrical component, and of fixating a second brim of the rail in a first snap-lock of the electrical component. Advantageously, the method can be performed easily without requiring any additional tools.

In a preferred embodiment of the method, fixating the second brim in the first snap-lock is performed by rotating the electrical component around the first brim. Advantageously, this allows for an easy and intuitive mounting of the electrical components onto the rail.

BRIEF DESCRIPTION OF THE DRAWINGS

The invention will now be explained in more detail with reference to the figures, in which:

FIG. 1 shows a perspective view of an electrical component mounted onto a T-type DIN rail;
FIG. 2 shows a G-type DIN rail.

DETAILED DESCRIPTION

Figure 3:
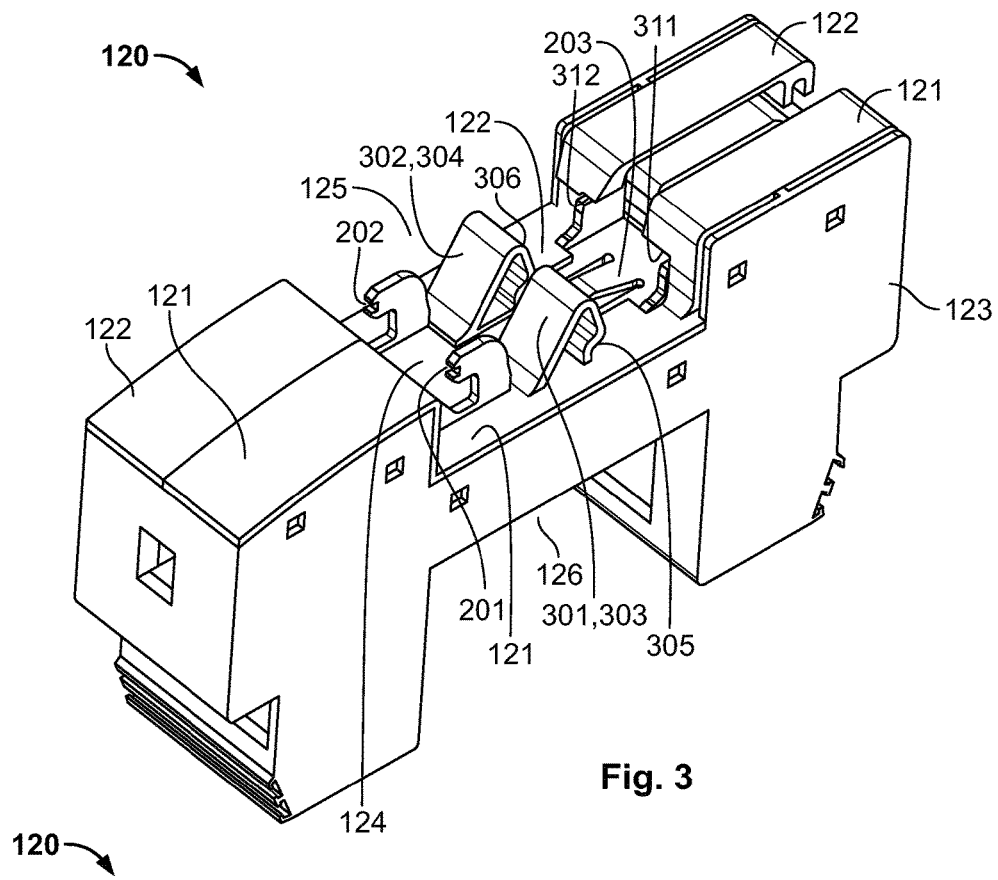
FIG. 3 shows a bottom view of a receptacle of the electrical component.

Rails for mounting electrical components thereon are available in various varieties. Such rails are for example used for mounting electrical components inside equipment racks or at other locations. DIN rails are one example of such rails. DIN rails are standardized by the Deutsches Institut für Normung, the German national standards organization. DIN rails are available in several types and sizes. A popular type is type T that is also referred to as type O or top-hat type and comprises a hat-shaped cross-section. The most popular variant of this type is 35 mm wide. Another wide-spread type is type G that comprises a G-shaped cross-section. G-type DIN rails are usually 32 mm wide.

In the following description, T-type DIN rails and G-type DIN rails are used for exemplification. The invention however is not limited to these types of rails but may be used in conjunction with a all kinds of rails.

FIG. 1 shows a perspective view of an electrical component 100. The electrical component 100 is mounted onto a T-type DIN rail 130. The electrical component 100 may for example be a surge-protection device. In one embodiment, the electrical component 100 is a low-voltage surge-protection device designed for being used in railway-signalling applications.

The electrical component 100 comprises a receptacle 120 and a module 110. The module 110 is arranged in a module recess 126 of the receptacle 120. The module 110 can be removed from the receptacle 120 and can be exchanged by another module. In case the electrical component 100 is a surge-protection device, the module 110 may for example be replaced with another module with a different voltage rating.

In the example shown in FIG. 1, the electrical component 100 is mounted onto the T-type DIN rail 130. The T-type DIN rail 130 is a standardized T-type DIN rail comprising a width of 35 mm. In an alternative embodiment, the T-type DIN rail 130 may comprise a different width.

The T-type DIN rail 130 comprises a hat-shaped cross-section with a bottom portion 130, a first brim 131, a second brim 132, a first vertical portion 134 and a second vertical portion 135. The first brim 131 and the second brim 132 are arranged in parallel to the bottom portion 131 and are respectively directed away from the bottom portion 133. The first vertical portion 134 and the second vertical portion 135 are arranged in parallel to each other and perpendicular to the bottom portion 133. The first vertical portion 134 connects the bottom portion 133 to the first brim 131. The second vertical portion 135 connects the bottom portion 133 to the second brim 132.

The electrical component 100 shown in FIG. 1 can also be mounted onto a G-type DIN rail. FIG. 2 shows a perspective view of a G-type DIN rail 140. The G-type DIN rail 140, as the T-type DIN rail 130, is made of an electrically conductive material, preferably a metal. The G-type DIN rail 140 comprises a bottom portion 143, a first brim 141, a second brim 142, a first vertical portion 144 and a second vertical portion 145. The first brim 141 and the second brim 142 are arranged in parallel to the bottom portion 143 and are respectively directed towards the center of the bottom portion 143. The first vertical portion 144 and the second vertical portion 145 are arranged in parallel to each other and perpendicular to the bottom portion 143. The first vertical portion 144 connects the bottom portion 143 to the first brim 141. The second vertical portion 145 connects the bottom portion 143 to the second brim 142. The second vertical portion 145 is longer than the first vertical portion 144. The second brim 142 is longer than the first brim 141. Altogether, the G-type DIN rail 140 comprises an approximately G-shaped cross-section. The G-type DIM rail 140 preferably comprises a width of 32 mm, but may also comprise a different width.

FIG. 3 shows a perspective view of a bottom side of the receptacle 120 of the electrical component 100. The receptacle 120 comprises a receptacle housing 123. Arranged in the receptacle housing 123 are a first contact housing 121, a second contact housing 122 and a grounding assembly 124. The first contact housing 121 and the second contact housing 122 are made of an electrically insulating material, preferably a plastic material. The first contact housing 121 and the second contact housing 122 are mirror images of each other.

The grounding assembly 124 is made of an electrically conductive material, preferably a metal. The grounding assembly 124 is arranged between the first contact housing 121 and the second contact housing 122.

The receptacle 120 of the electric component 100 comprises a rail recess 125 that is provided for receiving a portion of the T-type DIN rail 130 or the G-type DIN rail 140 when the electrical component 100 is mounted onto the T-type DIN rail 130 or the G-type DIN rail 140.

Figure 4:
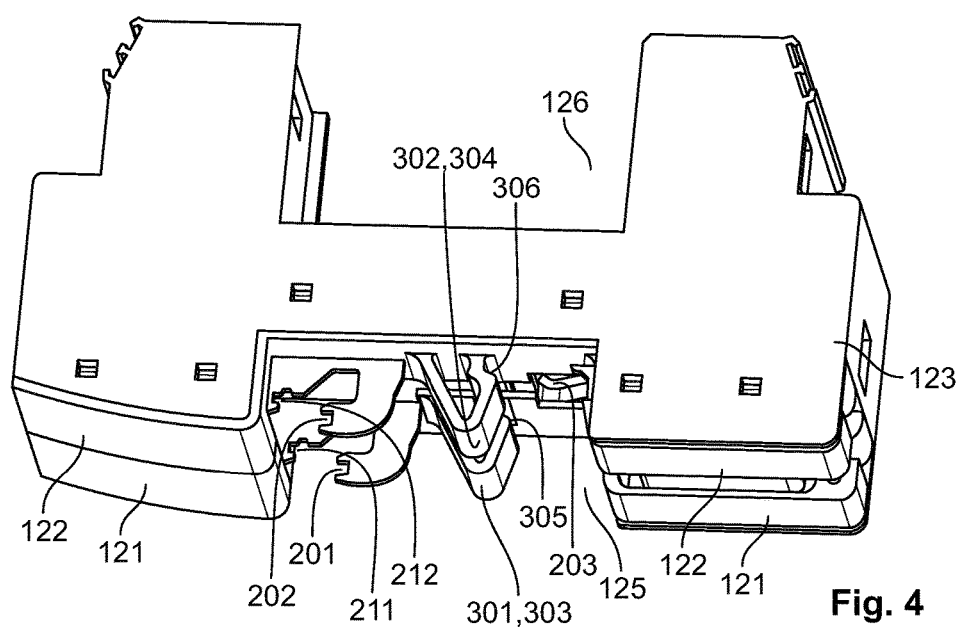
FIG. 4 shows a further view of the receptacle of the electrical component.

Arranged in the rail recess 125 are means for connecting the receptacle 120 of the electrical component 100 to the T-type DIN rail 130 and the G-type DIN rail 140. FIG. 4 shows a further view of the rail recess 125 of the receptacle 120 from a different angle. The receptacle 120 comprises a first outward-facing slot 201 and a second outward-facing slot 202. The first outward-facing slot 201 and the second outward-facing slot 202 are arranged in parallel to each other in the rail recess 125. The first outward-facing slot 201 and the second outward-facing slot 202 open in an outward direction away from the center of the rail recess 125. Both outward-facing slots 201, 202 comprise an electrically conductive material, preferably a metal, and are preferably formed integrally with the grounding assembly 124.

The rail recess 125 furthermore comprises a first inward-facing slot 211 and a second inward-facing slot 212. The inward-facing slots 211, 212 are arranged in parallel to each other and open in an inward direction towards the center of the rail recess 125. The inward-facing slots 211, 212 comprise an electrically conductive material, preferably a metal, and are preferably formed integrally with the outward-facing slots 201, 202 and the grounding assembly 124.

The rail recess 125 of the receptacle 120 furthermore comprises a first outward-facing snap-lock 301 and a second outward-facing snap-lock 302. The outward-facing snap-locks 301, 302 comprise an electrically insulating and elastically deformable material, preferably a plastic material. The first outward-facing snap-lock 301 comprises a first elastic portion 303 that is elastically deformable and a first outward-facing notch 305. The second outward-facing snap-lock 302 comprises an elastically deformable second elastic portion 304 and a second outward-facing notch 306. The outward-facing notches 305, 306 open in an outward direction away from the center of the rail recess 125. The first outward-facing snap-lock 301 is formed integrally with the first contact housing 121 of the receptacle 120. The second outward-facing snap-lock 302 is formed integrally with the second contact housing 122 of the receptacle 120.

Figure 5:
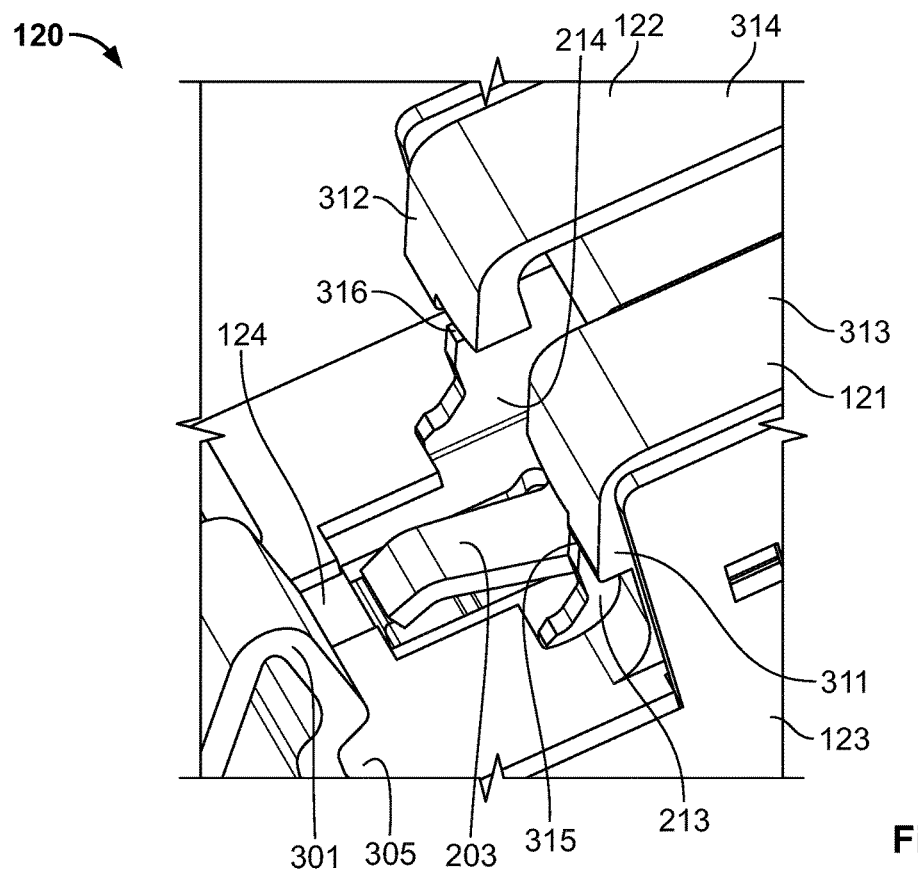
FIG. 5 shows a grounding lip of the receptacle of the electrical component.

The rail recess 125 of the receptacle 120 furthermore comprises a first inward-facing snap-lock 311 and a second inward-facing snap-lock 312. The first inward-facing snap-lock 311 and the second inward-facing snap-lock 312 are arranged in parallel to each other. The first inward-facing snap-lock 311 is formed integrally with the first contact housing 121. The second inward-facing snap-lock 312 is formed integrally with the second contact housing 122. The inward-facing snap-locks 311, 312 are made of an electrically insulating and elastically deformable material, preferably a plastic material. FIG. 5 shows a magnified view of the inward-facing snap-locks 311, 312. The first inward-facing snap-lock 311 comprises a first elastic portion 313 and a first inward-facing notch 315. The second inward-facing snap-lock 312 comprises a second elastic portion 314 and a second inward-facing notch 316. The inward-facing notches 315, 316 open in an inward direction towards the center of the rail recess 125.

The rail recess 125 furthermore comprises a first grounding edge 213 and a second grounding edge 214. The grounding edges 213, 214 comprise an electrically conductive material, preferably a metal. It is preferred that the grounding edges 213, 214 are formed integrally with the grounding assembly 124 of the receptacle 120 of the electrical component 100. The first grounding edge 213 is arranged in proximity to the first inward-facing snap-lock 311 such that the first inward-facing notch 315 is formed between the first grounding edge 213 and the first inward-facing snap-lock 311. The second grounding edge 214 is arranged in proximity to the second inward-facing snap-lock 312 such that the second inward-facing notch 316 is formed between the second grounding edge 214 and the second inward-facing snap-lock 312.

The rail recess 125 of the receptacle 120 furthermore comprises a grounding lip 203. The grounding lip 203 comprises an electrically conductive material, preferably a metal. It is preferred that the grounding lip 203 is formed integrally with the grounding assembly 124. The grounding lip 203 is arranged between the outward-facing snap-locks 301, 302 and the inward-facing snap-locks 311, 312. The grounding lip 203 is preferably elastically deformable.

Figure 6:
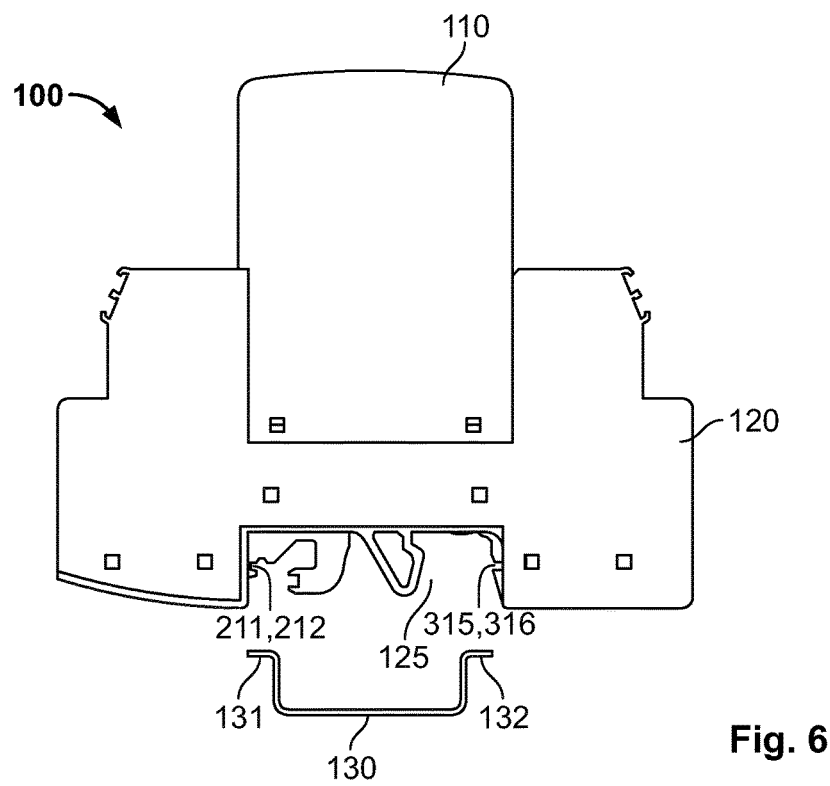
FIG. 6 shows a side-view of the electrical component and a T-type rail.

FIG. 6 shows a side-view of the electrical component 100 and the T-type DIN rail 130 before mounting the electrical component 100 onto the T-type DIN rail 130. FIG. 6 shows that the distance between the inward-facing slots 211, 212 and the inward-facing notches 315, 316 approximately equals the width of the T-type DIN rail 130. In case the T-type DIN rail 130 comprises a width of 35 mm, the distance between the inward-facing slots 211, 212 and the inward-facing notches 315, 316 equals approximately 35 mm.

Figure 7:
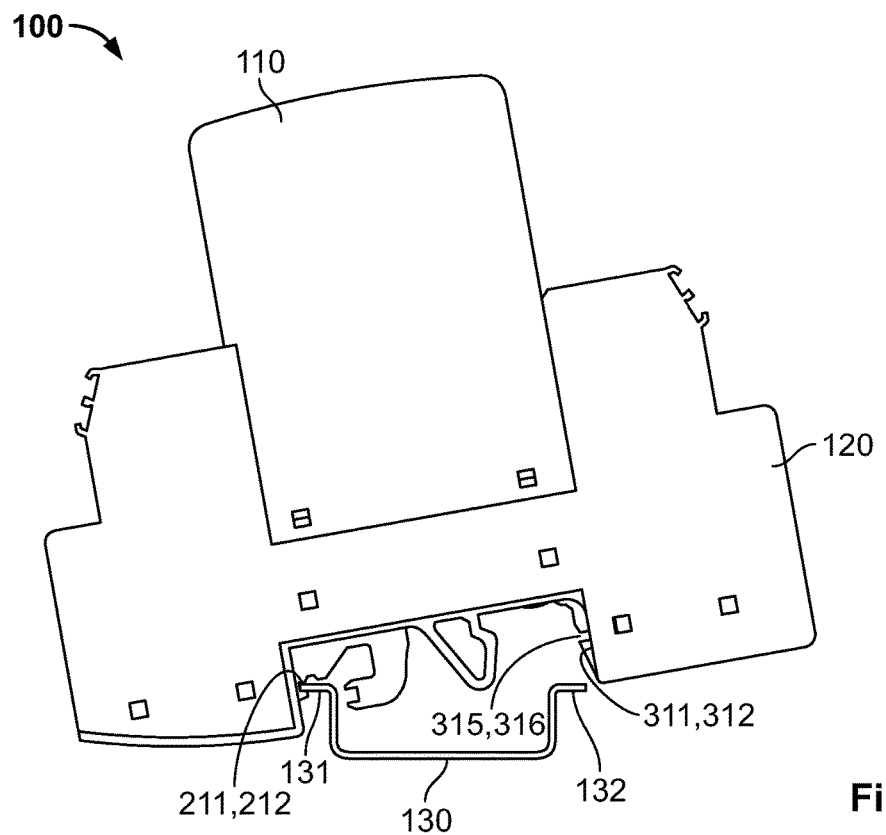
FIG. 7 illustrates a first step of mounting the electrical component onto the T-type DIN rail.
Figure 8:
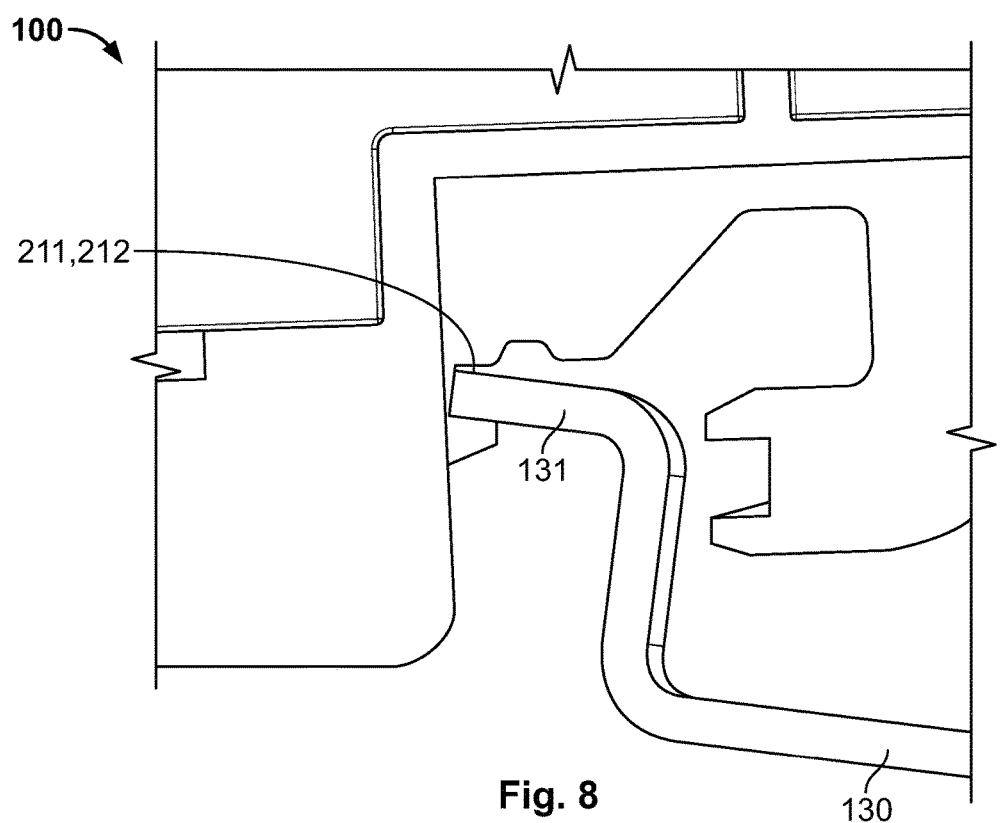
FIG. 8 shows a detail of a brim hinged in an inward-facing slot of the electrical component.

FIG. 7 shows a side-view of the electrical component 100 after carrying out a first step of mounting the electrical component 100 onto the T-type DIN rail 130. The first brim 131 has been hinged into the first inward-facing slot 211 and the second inward-facing slot 212. The electrical component 100 is therefore slightly tilted around an axis that is parallel to a longitudinal direction of the T-type DIN rail 130. The second brim 132 of the T-type DIN rail 130 remains free. FIG. 8 shows a magnified view of the first brim 131 of the T-type DIN rail 130 inserted into the inward-facing slots 211, 212.

Figure 9:
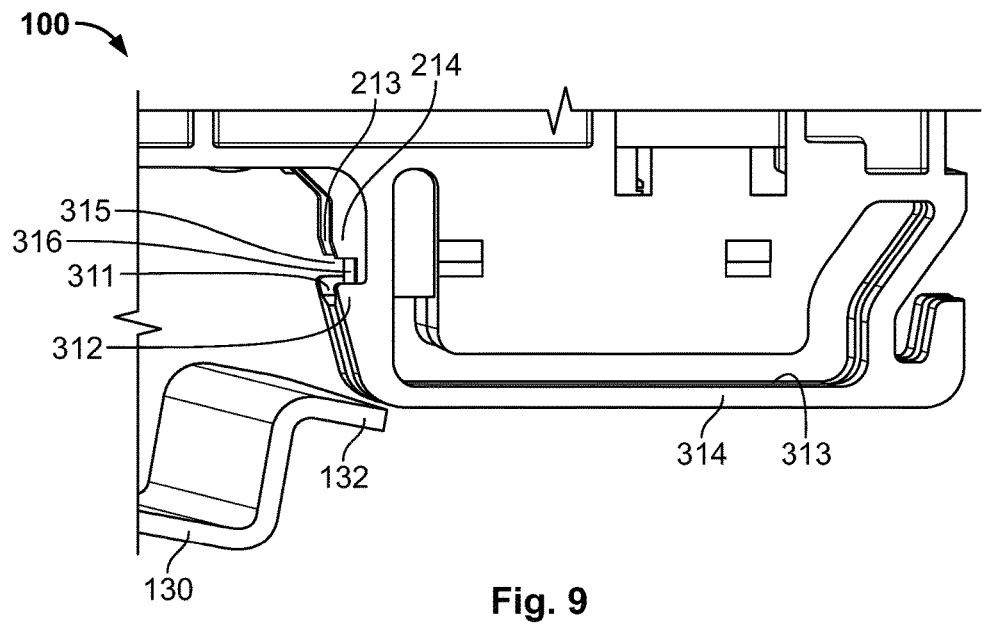
FIG. 9 illustrates a further step of mounting the electrical component onto the T-type DIN rail.

FIG. 9 shows a magnified view of the portion of the receptacle 120 that comprises the inward-facing snap-locks 311, 312. In the depiction of FIG. 9, the receptacle housing 123 of the receptacle 120 has been removed for clearness. FIG. 9 clearly shows the elastic portions 313, 314 of the inward-facing snap-locks 311, 312.

Figure 10:
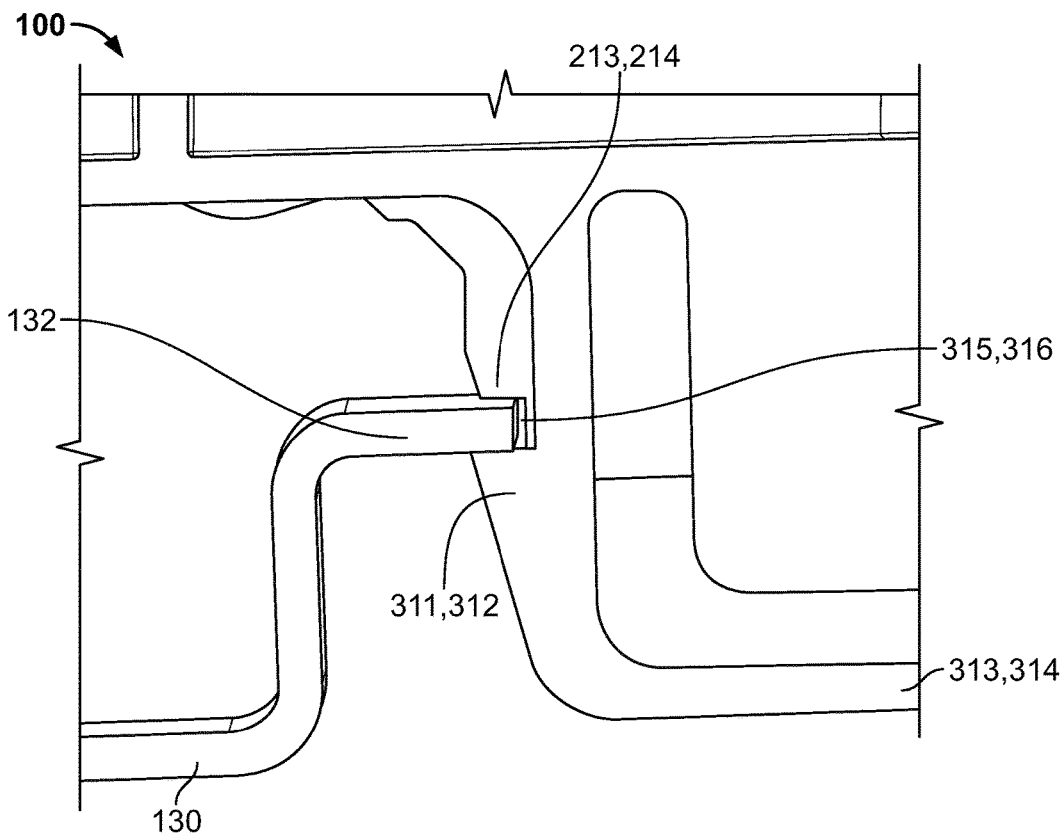
FIG. 10 illustrates a further step of mounting the electrical component onto the T-type DIN rail.

In order to fixate the second brim 132 of the T-type DIN rail 130 in the inward-facing notches 315, 316, the electrical component 100 is rotated around the first brim 131 of the T-type DIN rail 130 hinged in the inward-facing slots 211, 212, to move the second brim 132 towards the inward-facing notches 315, 316. When the second brim 132 of the T-type DIN rail 130 approaches the inward-facing notches 315, 316, the second brim 132 elastically deforms the elastic portions 313, 314 of the inward-facing snap-locks 311, 312 in a direction away from the T-type DIN rail 130 (towards the right side of FIG. 9). Once the second brim 132 of the T-type DIN rail 130 reaches the inward-facing notches 315, 316, the elastic portions 313, 314 of the inward-facing snap-locks 311, 312 elastically return to their equilibrium positions, fixating the second brim 132 in the inward-facing notches 315, 316 between the inward-facing snap-locks 311, 312 and the grounding edges 213, 214. This final position is depicted in FIG. 10.

Figure 11:
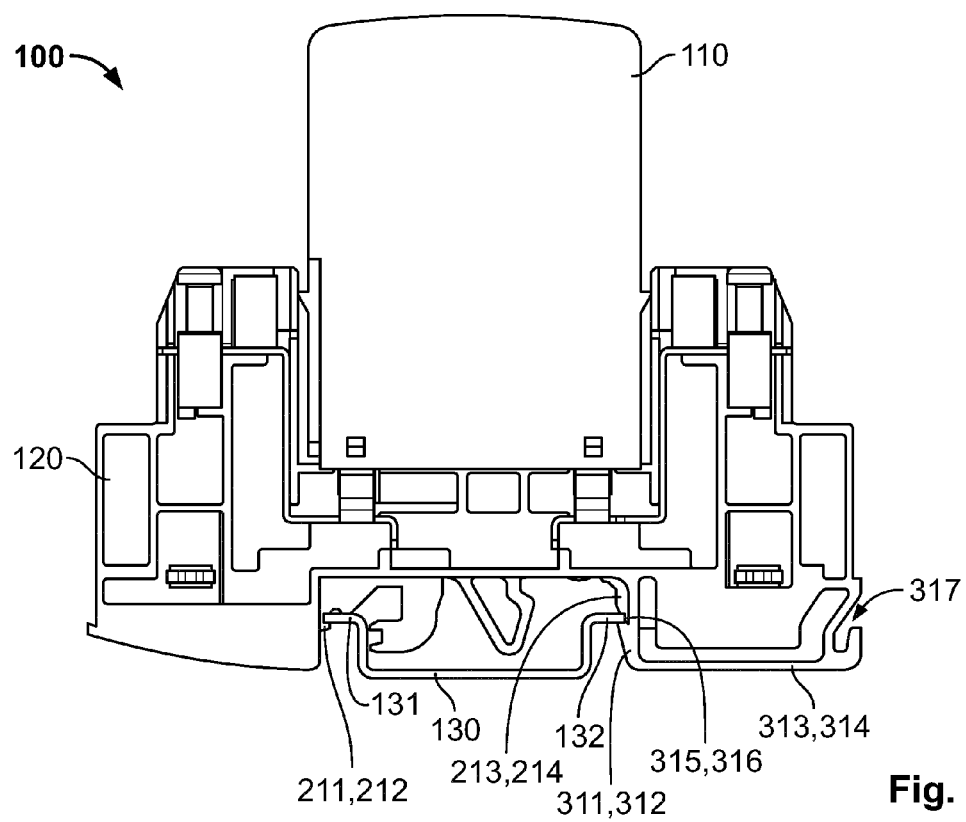
FIG. 11 shows the electrical component mounted onto the T-type DIN rail.

FIG. 11 shows the electrical component 100 completely mounted onto the T-type DIN rail 130. The first brim 131 of the T-type DIN rail 130 is received in the inward-facing slots 211, 212. The second brim 132 of the T-type DIN rail 130 is fixated in the inward-facing notches 315, 316 by the inward-facing snap-locks 311, 312. The metallic T-type DIN rail 130 is both in contact with the metallic inward-facing slots 211, 212 and the grounding edges 213, 214. These electrically conductive connections provide a grounding for the electrical component 100. Any fault current in the electrical component 100 can flow via the grounding assembly 124, the inward-facing slots 211, 212 and the grounding edges 213, 214 into the T-type DIN rail 130.

FIG. 11 furthermore shows that the receptacle 120 of the electrical component 100 comprises a release latch 317 that is arranged on the elastic portions 313, 314 of the inward-facing snap-locks 311, 312 at a position opposite to the inward-facing notches 315, 316. The release latch 317 is accessible from outside when the electrical component 100 is mounted onto the T-type DIN rail 130. A user can use the release latch 317 to elastically deform the elastic portions 313, 314 of the inward-facing snap-locks 311, 312 to release the second brim 132 of the T-type DIN rail 130 from the inward-facing notches 315, 316. Once the second brim 132 of the T-type DIN rail 130 is released from the inward-facing notches 315, 316, the electrical component 100 can be removed from the T-type DIN rail 130. A user may apply a suitable tool to the release latch 317 in order to elastically deform the elastic portions 313, 314 of the inward-facing snap-locks 311, 312.

Figure 12:
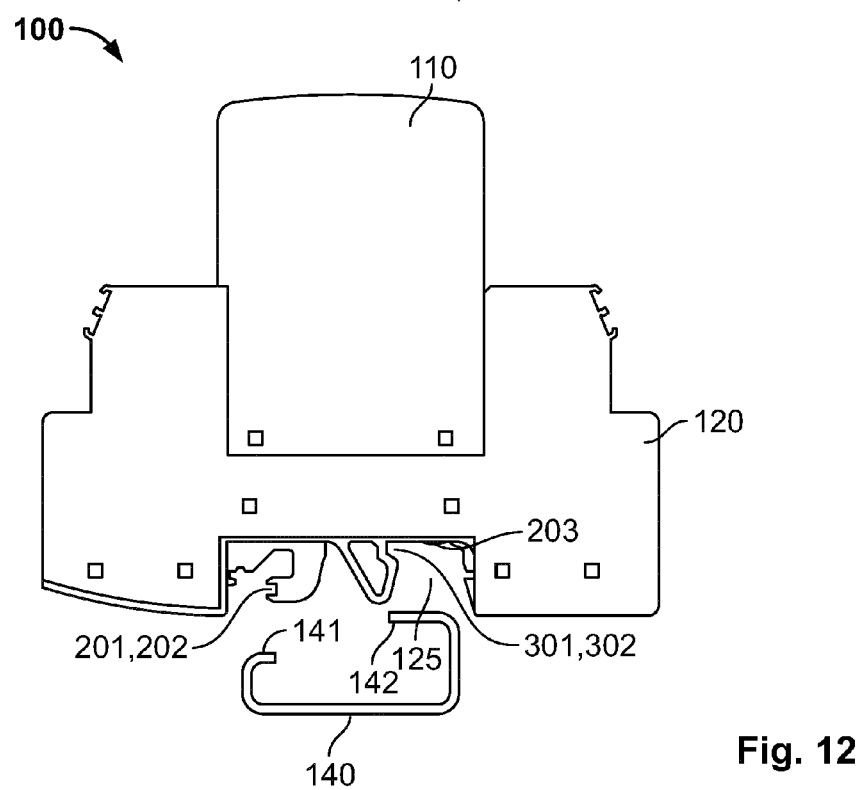
FIG. 12 shows a side-view of the electrical component and a G-type DIN rail.

FIG. 12 shows the electrical component 100 and the G-type DIN rail 140 before mounting the electrical component 100 onto the G-type DIN rail 140. FIG. 12 shows that the distance between the outward-facing slots 201, 202 and the outward-facing snap-locks 301, 302 approximately equals the distance between the tips of the first brim 141 and the second brim 142 of the G-type DIN rail 140.

Figure 13:
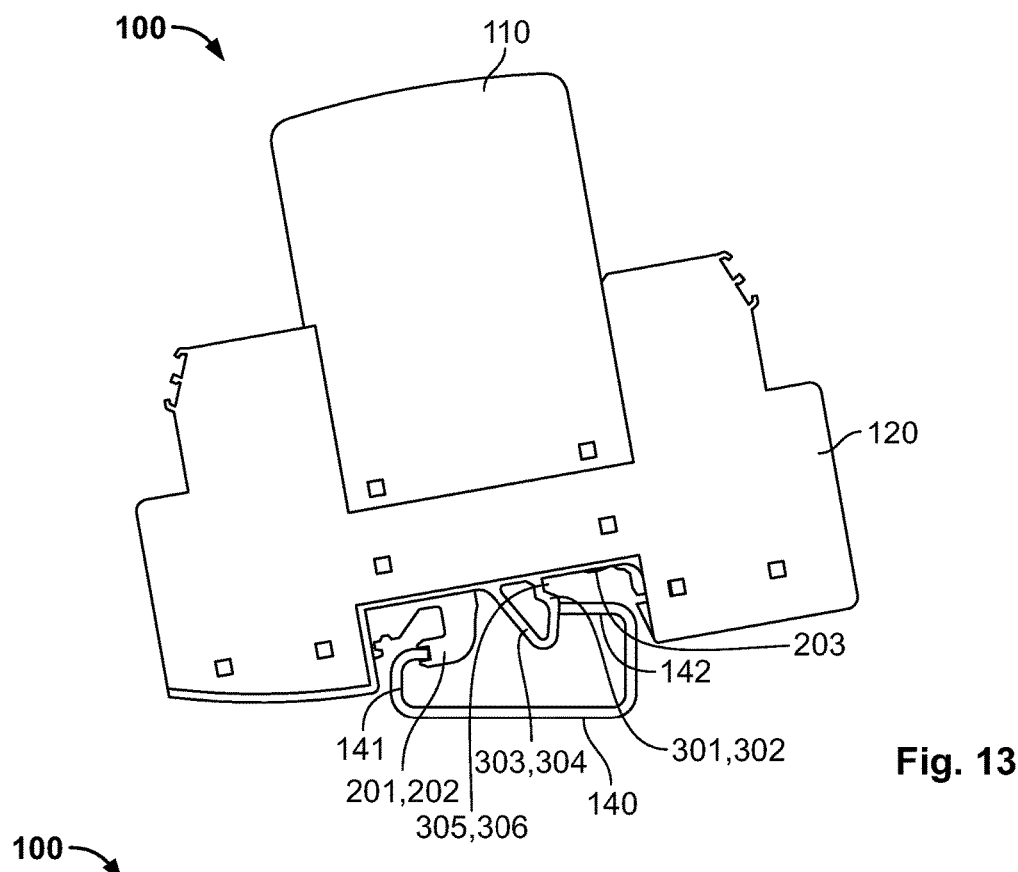
FIG. 13 illustrates a first step of mounting the electrical component onto the G-type DIN rail.
Figure 14:
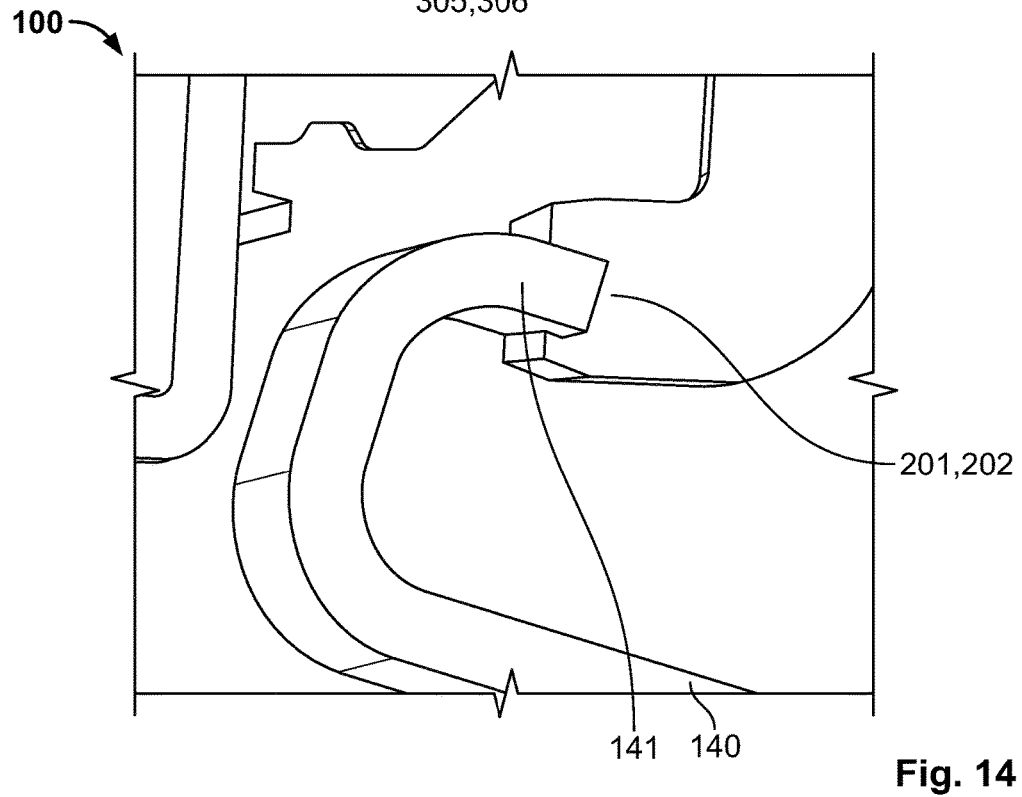
FIG. 14 shows a detail of a brim of the G-type DIN rail hinged in an outward-facing slot of the electrical component.

In order to mount the electrical components 100 onto the G-type DIN rail 140, the first brim 141 of the G-type DIN rail 140 is first hinged into the outward-facing slots 101, 102, as shown in FIG. 13. This requires to slightly turn the electrical component 100 around an axis that is parallel to the longitudinal direction of the G-type DIN rail 140. FIG. 14 shows a magnified view of the first brim 141 of the G-type DIN rail 140 inserted into the outward-facing slots 201, 202.

Figure 15:
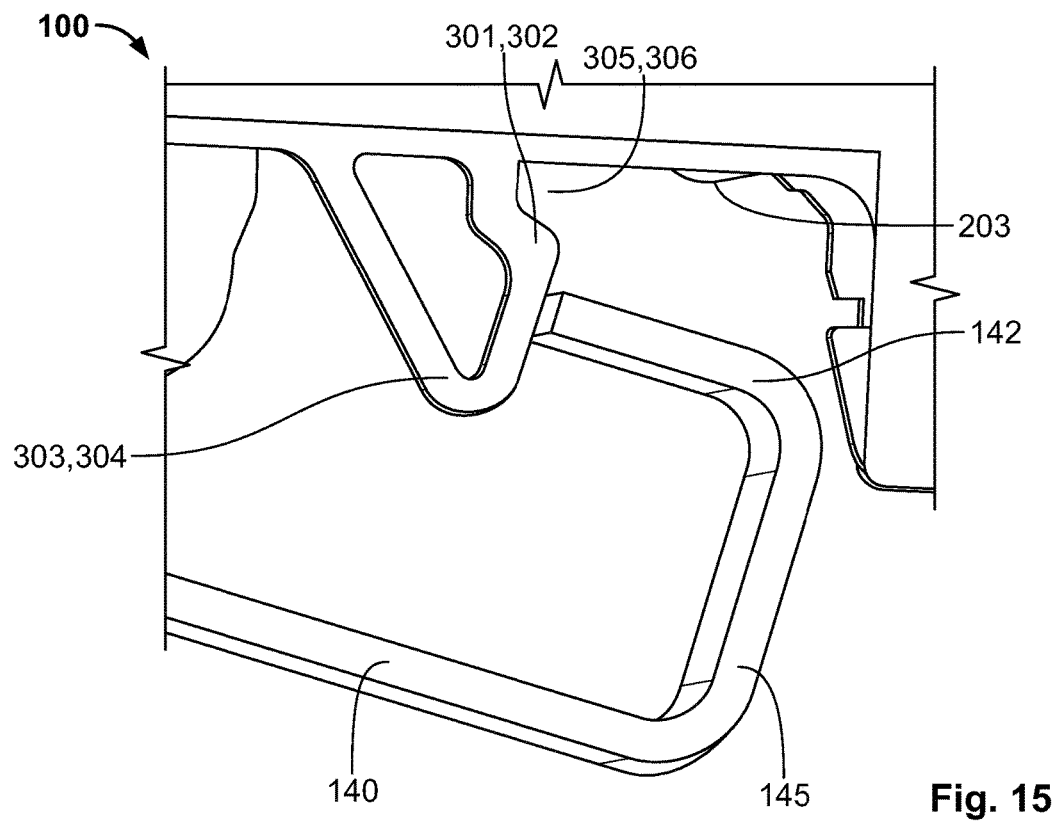
FIG. 15 illustrates a further step of mounting the electrical component onto the G-type DIN rail.
Figure 16:
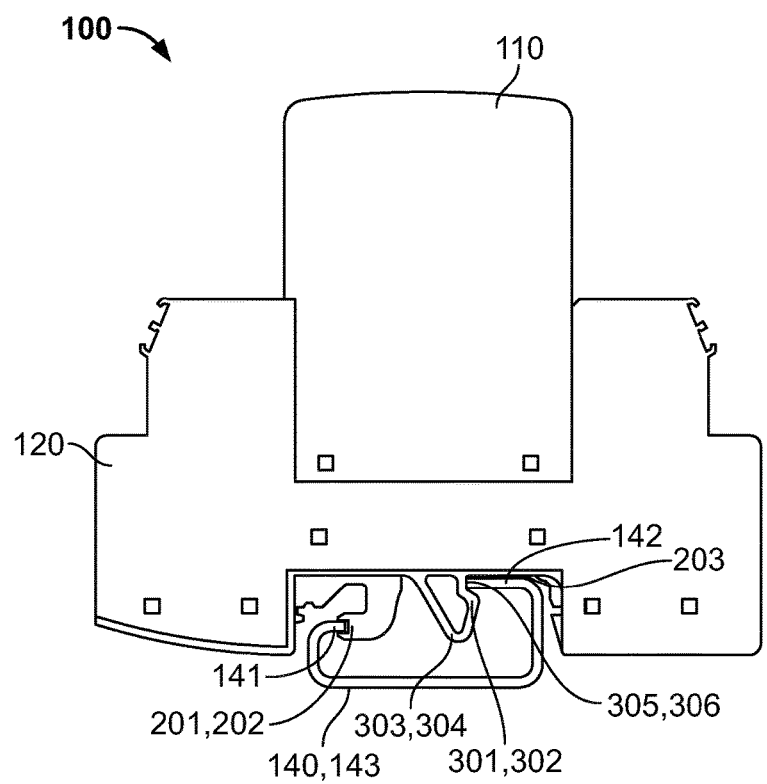
FIG. 16 shows the electrical component mounted onto the G-type DIN rail.

In a following step, the electrical component 100 is rotated around the first brim 141 hinged in the outward-facing slots 201, 202, to fixate the second brim 142 of the G-type DIN rail 140 in the outward-facing notches 305, 306. As can be seen in FIG. 15, the second brim 142 slides along the outward-facing snap-locks 301, 302 during the rotation of the electrical component 100, thereby elastically deforming the elastic portions 303, 304 of the outward-facing snap-locks 301, 302 in a direction away from the second vertical portion 145 of the G-type DIN rail 140 to allow the second brim 142 to reach the outward-facing notches 305, 306. Once the second brim 142 of the G-type DIN rail 140 has reached the outward-facing notches 305, 306, the elastic portions 303, 304 of the outward-facing snap-locks 301, 302 elastically return to their equilibrium positions and fixate the second brim 142 of the G-type DIN rail 140 behind the outward-facing snap-locks 301, 302 in the outward-facing notches 305, 306. FIG. 16 shows the resulting arrangement in which the electrical component 100 is mounted onto the G-type DIN rail 140.

The first brim 141 of the G-type DIN rail 140 is in electrical contact with the outward-facing slots 201, 202. At the same time, the second brim 142 is in electrically conductive contact to the grounding lip 203 of the receptacle 120 of the electrical component 100. The outward-facing slots 201, 202 and the grounding lip 203 are in electric contact with the grounding assembly 124. The outward-facing slots 201, 202 and the grounding lip 103 therefore provide a grounding of the electrical component 100. Fault currents in the electrical component 100 can flow via the grounding assembly 124, the outward-facing slots 201, 202 and the grounding lip 203 into the G-type DIN rail 140.

In order to remove the electrical component 100 from the G-type DIN rail 140, it is sufficient to lift the electrical component 100 in an upwards direction perpendicular to the bottom portion 143 of the G-type DIN rail 140. Pulling the electrical component 100 upwards elastically deforms the outward-facing snap-locks 301, 302 to release the second brim 142 of the G-type DIN rail 140 from the outward-facing notches 305, 306. This may be supported by a downwardly declined design of the outward-facing snap-locks 301, 302 in the area of the outward-facing notches 305, 306.

Figure 17:
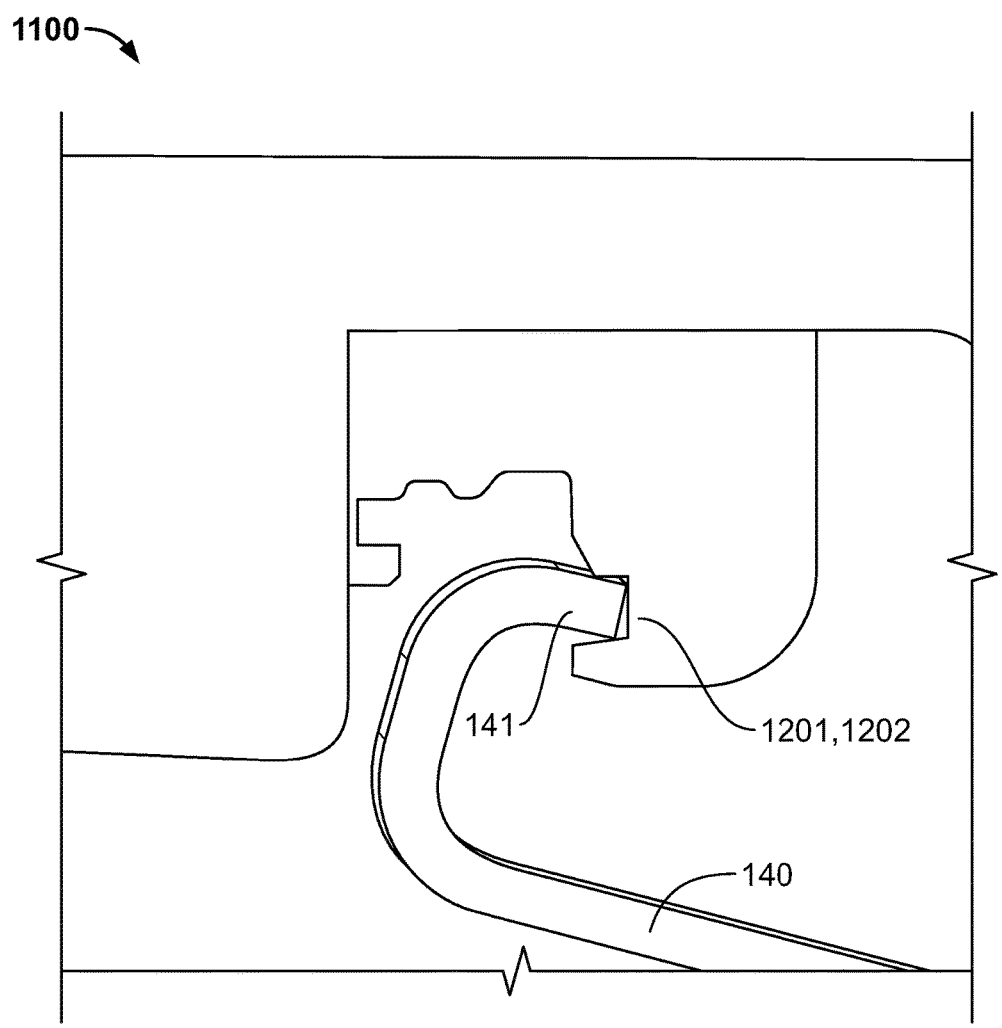
FIG. 17 shows an alternative embodiment of an outward-facing slot of the electrical component.

FIG. 17 depicts a detail of an electrical component 1100 according to an alternative embodiment. FIG. 17 shows a magnified view of the first brim 141 of the G-type DIN rail 140 inserted into outward-facing slots 1201, 1202 of the electrical component 1100. The design of the outward-facing slots 1201, 1202 of the electrical component 1100 is slightly different from the design of the outward-facing slots 201, 202 of the electrical component 100 shown in FIG. 14. The outward-facing slots 1201, 1202 of the electrical component 1100 allow for a larger clearance between the outward-facing slots 1201, 1202 and the elastic portions 303, 304 of the electrical component 1100. The functionality explained above in conjunction with FIGS. 6 to 16 remains the same for the electrical component 1100 shown in FIG. 17.

The invention claimed is:

1. An electrical component adapted for being mounted onto a rail, comprising:
    a first outward-facing slot and a second outward-facing slot for receiving a first brim of a rail of a first rail type;
    a first outward-facing snap-lock and a second outward-facing snap-lock for fixating a second brim of a rail of the first rail type;
    a first inward-facing slot and a second inward-facing slot for receiving a first brim of a rail of a second rail type;
    a first inward-facing snap-lock and a second inward-facing snap-lock for fixating a second brim of a rail of the second type;
    wherein at least one of the first outward-facing snap-lock or the first inward-facing snap-lock comprises an electrically insulating, elastically deformable material; and
    wherein at least one of the first outward-facing slot or the first inward-facing slot comprises an electrically conductive material which forms a grounding contact.

2. The electrical component according to claim 1, wherein the first outward-facing snap-lock and the first inward-facing snap-lock comprise an electrically insulating, elastically deformable material.

3. The electrical component according to claim 1, wherein the first outward-facing slot and the first inward-facing slot comprise an electrically conductive material.

4. The electrical component according to claim 1, wherein the electrical component comprises a first grounding edge that is adapted to electrically contact a second brim of a rail of the second type that is fixated by the first inward-facing snap-lock.

5. The electrical component according to claim 1, wherein the electrical component comprises a grounding lip that is adapted to electrically contact a second brim of a rail of the first type that is fixated by the first outward-facing snap-lock.

6. The electrical component according to claim 1, wherein the electrical component comprises a release latch for releasing a second brim of a rail of the second type from the first inward-facing snap-lock.

7. The electrical component according to claim 6, wherein the release latch is formed of electrically insulating, elastically deformable material and is integrated with the at least one first inward-facing snap-lock.

8. The electrical component according to claim 1, wherein the electrical component comprises a receptacle, wherein the receptacle comprises a first recess for receiving a portion of a rail.

9. The electrical component according to claim 8, wherein the receptacle comprises a second recess for receiving an electric module.

10. The electrical component according to claim 1, wherein a rail of the first rail type is a G-type DIN rail, wherein a rail of the second rail type is a T-type DIN rail.

11. The electrical component according to claim 1, wherein the electrical component is a surge protection device.

12. An electrical component adapted for being mounted onto a rail, comprising:
    a first outward-facing slot for receiving a first brim of a rail of a first rail type;
    a first outward-facing snap-lock for fixating a second brim of a rail of the first rail type;
    a first inward-facing slot for receiving a first brim of a rail of a second rail type; and
    a first inward-facing snap-lock for fixating a second brim of a rail of the second type;
    wherein the electrical component comprises an electrically conductive grounding assembly, wherein the grounding assembly comprises the first outward-facing slot and the first inward-facing slot.

13. The electrical component according to claim 12, wherein the electrical component comprises a first grounding edge that is adapted to electrically contact a second brim of a rail of the second type that is fixated by the first inward-facing snap-lock.

14. The electrical component according to claim 13, wherein the electrical component comprises a grounding lip that is adapted to electrically contact a second brim of a rail of the first type that is fixated by the first outward-facing snap-lock.

15. The electrical component according to claim 14, wherein the grounding assembly comprises the first grounding edge and the grounding lip.

* * * * *